US007735224B2

(12) United States Patent
Thompson (10) Patent No.: US 7,735,224 B2
(45) Date of Patent: Jun. 15, 2010

(54) METHODS OF APPLYING OZONE-DEPLETING CATALYSTS TO AIR STREAM COMPONENTS

(75) Inventor: Mark Thompson, Summerville, SC (US)

(73) Assignee: JW Aluminum Company, Mount Holly, SC (US)

( * ) Notice: Subject to any disclaimer, the term of this patent is extended or adjusted under 35 U.S.C. 154(b) by 650 days.

(21) Appl. No.: 11/370,153

(22) Filed: Mar. 7, 2006

(65) Prior Publication Data
US 2006/0204656 A1 Sep. 14, 2006

Related U.S. Application Data

(63) Continuation-in-part of application No. 10/931,839, filed on Sep. 1, 2004, now Pat. No. 7,669,327.

(51) Int. Cl.

| | |
|---|---|
| *B05D 1/12* | (2006.01) |
| *B05D 1/18* | (2006.01) |
| *B05D 3/02* | (2006.01) |
| *B21D 51/16* | (2006.01) |
| *B21D 51/18* | (2006.01) |
| *B21D 53/02* | (2006.01) |
| *B21D 53/06* | (2006.01) |
| *B21K 1/16* | (2006.01) |

(52) U.S. Cl. .............................. 29/890.03; 29/890.035; 29/890.06; 29/890.07; 29/890.144; 427/180; 427/372.2; 427/421.1; 427/430.1; 118/715

(58) Field of Classification Search .................. 29/889, 29/889.2, 890.03, 890.035, 890.06, 890.07, 29/890.144–15; 118/715; 427/10, 372.2, 427/421.1, 430.1; 454/228

See application file for complete search history.

(56) References Cited

U.S. PATENT DOCUMENTS

| | | | | |
|---|---|---|---|---|
| 4,812,086 | A | 3/1989 | Kopernicky | |
| 5,145,822 | A | 9/1992 | Falke et al. | 502/150 |
| 5,187,137 | A | 2/1993 | Terui et al. | 502/241 |
| 5,212,140 | A | 5/1993 | Yoshimoto et al. | 502/300 |
| 5,221,649 | A | 6/1993 | Yoshimoto et al. | 502/84 |
| 5,262,129 | A | 11/1993 | Terada et al. | 422/122 |
| 5,296,435 | A | 3/1994 | Kitaguchi et al. | 502/174 |
| 5,422,331 | A | 6/1995 | Galligan et al. | 502/333 |
| 5,993,909 | A | 11/1999 | Mizutani et al. | 427/379 |
| 5,997,831 | A | 12/1999 | Dettling et al. | 423/219 |
| 6,190,627 | B1 | 2/2001 | Hoke et al. | 423/219 |
| 6,281,159 | B1 | 8/2001 | Fromson et al. | 502/324 |
| 6,361,872 | B1 | 3/2002 | Hosono et al. | 428/467 |
| 6,375,905 | B1 | 4/2002 | Moini et al. | 422/180 |
| 6,486,092 | B2 | 11/2002 | Fromson et al. | 502/324 |
| 6,540,843 | B1 | 4/2003 | Liu et al. | 148/243 |
| 6,555,079 | B2 | 4/2003 | Hoke et al. | 423/210 |
| 6,569,393 | B1 | 5/2003 | Hoke et al. | 423/219 |
| 6,681,619 | B2 | 1/2004 | Alleving et al. | 73/118.1 |
| 6,682,774 | B2 | 1/2004 | Smith et al. | 427/180 |

(Continued)

*Primary Examiner*—David P Bryant
*Assistant Examiner*—Alexander P Taousakis
(74) *Attorney, Agent, or Firm*—Myers Bigel Sibley & Sajovec (57) ABSTRACT

Systems and methods of applying an ozone-depleting catalytic coating to an air stream component for producing a durable surface with optimal ozone depletion characteristics are provided. An air stream component having a surface with favorable adhesive properties or coatings is exposed to a concentration of ozone-depleting catalytic particles, wherein the receptive surface of the coated substrate binds the ozone-depleting catalytic coating.

23 Claims, 10 Drawing Sheets

U.S. PATENT DOCUMENTS

| | | | |
|---|---|---|---|
| 6,684,629 B2 | 2/2004 | Bayerle et al. | 60/277 |
| 6,699,529 B2 * | 3/2004 | Garner et al. | 427/427 |
| 6,818,254 B1 * | 11/2004 | Hoke et al. | 427/421.1 |
| 6,926,784 B2 * | 8/2005 | Bock | 156/78 |
| 7,067,454 B2 * | 6/2006 | Raybould | 502/320 |
| 2004/0043156 A1 | 3/2004 | Emch | 427/385.5 |

* cited by examiner

```
┌─────────────────────┐
│   APPLY LIQUID      │
│   COATING TO AIR    │
│   STREAM COMPONENT  │
│                     │
│                410  │
└─────────────────────┘
           │
           ▼
┌─────────────────────┐
│  CONTACT AIR STREAM │
│  COMPONENT WITH     │
│  SOLID PARTICULATE  │
│  COATING            │
│                 420 │
└─────────────────────┘
```

METHODS OF APPLYING OZONE-DEPLETING CATALYSTS TO AIR STREAM COMPONENTS

CROSS-REFERENCE TO RELATED APPLICATION

This application is a continuation-in-part of copending U.S. utility application entitled, "SYSTEMS AND METHODS OF APPLYING OZONE-DEPLETING CATALYSTS TO HEAT EXCHANGERS" having Ser. No. 10/931,839, filed Sep. 1, 2004 now U.S. Pat. No. 7,669,327, which is entirely incorporated herein by reference.

TECHNICAL FIELD

The present disclosure is generally related to systems and methods for applying coating to components and, more particularly, is related to systems and methods for providing ozone-depleting catalysts in air stream applications.

BACKGROUND

Compositions capable of performing, for example, a catalytic reduction of ozone to oxygen have been developed. For example, U.S. Pat. No. 5,221,649 to Yoshimoto et al. discloses catalysts and methods for ozone depletion. Further, methods of catalytically treating the atmosphere using heat exchange devices are disclosed in U.S. Pat. No. 5,997,831 to Dettling et al. These methods produce a surface with catalytic particles either partially or fully isolated from the atmosphere by a thin film or covering.

Reference is now made to FIG. 1, which illustrates a cross-sectional view of a substrate coated with catalytic conversion particles using methods of the prior art. The substrate 110 has an adhesive coating 120 and catalytic conversion particles 130, 140, 150. For example, some of the particles 130 are covered by a thin film of the adhesive coating 120, thus reducing the capacity of that particle to contact the atmosphere and thus convert atmospheric ozone. Also, by way of example, note that other particles 140 are substantially covered by the adhesive coating 120, thereby reducing the particle surface exposed to the atmosphere. The totally and partially covered particles 130, 140 can be the result of a catalytic conversion coating delivery system which utilizes a slurry as a medium for applying the particles.

One way of providing consistently increased ozone conversion rates is to increase the amount of exposed surface area of the catalytic conversion material. Another way of providing increased ozone conversion rates is to maximize the areas covered by the catalytic conversion material. Thus, a heretofore-unaddressed need exists in the industry to address the aforementioned deficiencies and inadequacies.

SUMMARY

Embodiments of the present disclosure provide systems for applying an ozone-depleting coating to an air stream component. Certain systems comprise: a first coating device, for applying a liquid coating to the air stream component; a curing device, for curing the liquid coating on the air stream component, such that the liquid coating cures into an elastic coating; a heating device, for heating the coated air stream component; and a second coating device, for applying an ozone-depleting solid particulate coating to the coated air stream component, wherein the ozone-depleting solid particulate coating is comprised of a plurality of coating particles, such that a portion of the plurality of coating particles adheres to the elastic coating.

Embodiments of the present disclosure can also be viewed as providing methods for applying an ozone-depleting coating to an air stream component, comprising: applying a liquid coating to the air stream component; and contacting the air stream component with a solid particulate coating, wherein the solid particulate coating adheres to the air stream component.

Another embodiment of the present disclosure can be viewed as an apparatus configured to reduce ozone, the apparatus comprising: an air stream component, wherein the air stream component comprises: a structural component; and an outer coating, wherein the outer coating is a dry particulate coating, wherein the outer coating is applied after the structural component is heated, wherein the outer coating adheres to the structural component, and wherein the outer coating causes a catalytic ozone conversion.

Another embodiment of the present disclosure can be viewed as a system for applying an ozone-depleting coating to an air handling device, comprising: a liquid coating means for applying a liquid coating to a first air stream component and a second air stream component; a drying means for drying the liquid coating on the first stream component and the second air stream component, such that the liquid coating dries into an elastic coating; an assembling means for securing the first air stream component and the second air stream component in the air handling device; a heating means for heating first air stream component and the second air stream component, such that the elastic coating is configured to initiate an adhesive property; and a dry coating means for applying a solid particulate coating to the first air stream component and the second air stream component by providing the coating to the air handling device, such that the solid particulate coating adheres to the elastic coating on surfaces adjacent an air stream, the solid particulate coating further comprising an ozone-depleting material.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 1 illustrates a cross-sectional view of a substrate coated with catalytic particles using the methods of the prior art.

FIG. 2 illustrates a representation of a cross-sectional view of an air stream component with an ozone-depleting catalyst coating applied.

FIG. 3 is a block diagram illustrating an embodiment of a method of applying ozone-depleting catalysts to an air stream component.

FIG. 4 is a block diagram illustrating an embodiment of a method of applying an ozone-depleting coating to an air stream component.

DETAILED DESCRIPTION

Figure 1:
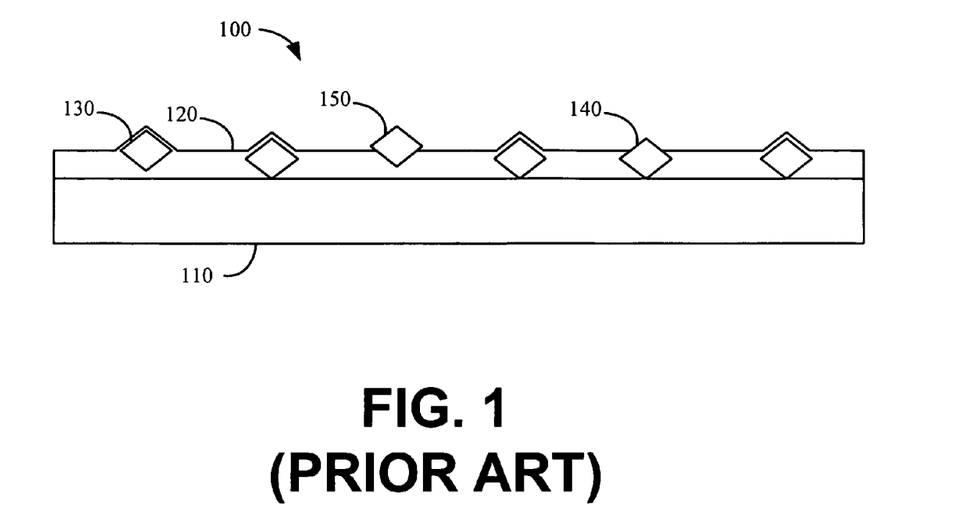
Figure 2:
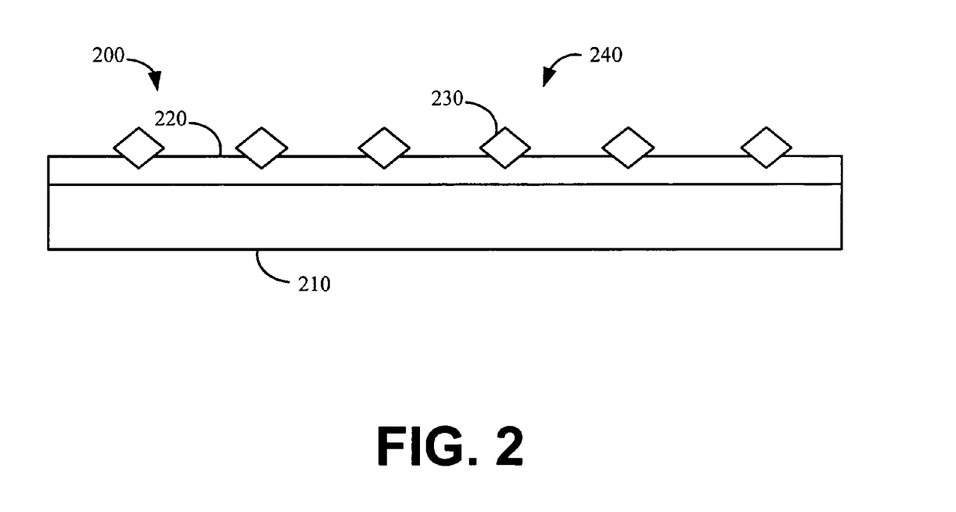

Reference is now made to FIG. 2, which illustrates a representation of a cross-sectional view of a substrate with an ozone-depleting catalyst coating applied. The coated component 200 includes the air stream component 210, which, by way of example, can be a metallic plastic, or composted component. The air stream component 210 can be any number of components that would be found in an air processing or air handling system, including, for example, fans, impellers, dampers, flow straighteners, ducts and other surfaces within such a system or apparatus. In this embodiment, at least one surface of the air stream component 210 is coated with, for example, an adhesive coating 220. In some embodiments, the adhesive coating is heat activated adhesive coating. Coatings of this type are frequently applied in liquid form and subsequently cured using, for example, heat. The temperature range for curing the heat activated liquid adhesive coating of this embodiment is preferably between 250 and 550 degrees Fahrenheit, more preferably between 300 and 500 degrees Fahrenheit, and more preferably between 400 and 450 degrees Fahrenheit.

Alternative embodiments can include adhesive coatings that are applied and cured without heat. Such coatings, for example, can be cured using air, a chemical agent, or ultra-violet light, among others. A solid particulate coating 230 of, for example, ozone-depleting catalysts, is adhered to at least one surface of the air stream component 210 by the adhesive properties of the adhesive coating 220. A significant portion of the surface area of the particles in the solid particulate coating 230 is exposed to the atmosphere 240 and thus, is available to perform the catalytic ozone conversion.

The liquid coatings in this disclosure may be but are not limited to adhesive or coatings in any one of the acid copolymers and ionomers, metallocenes, erethanes, plastomers, linear ethylene polymers and any and all tackifier resins. For exemplary purposes, the acid copolymers and ionomers would include, but not be limited to, ethylene acrylic acid, vinyl acetate types, ethylene methyl acrylate and ethylene butyl acrylate. Further, the solid particulate coating of ozone-depleting catalysts may include but is not limited to Manganese Dioxide, Palladium, Palladium Dioxide and Titanium Dioxide.

Figure 3:
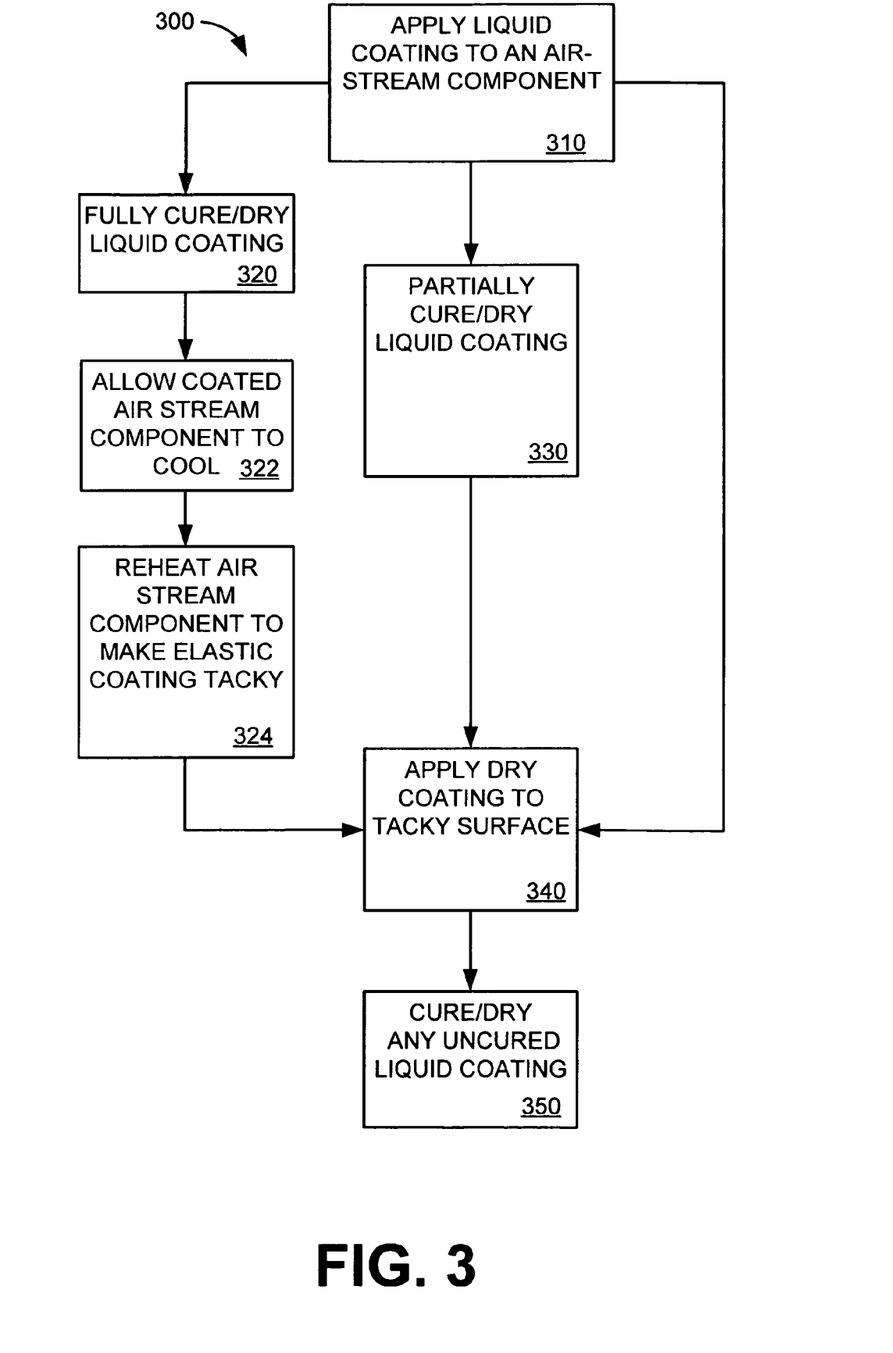

Reference is now made to FIG. 3, which illustrates an embodiment of a method of applying ozone-depleting catalysts to an air stream component. The method 300 of this embodiment has a first step of applying a liquid coating to an air stream component 310. The application of the liquid coating to the air stream component can be performed using a variety of liquid coating delivery devices and methods. For example, some forms of liquid coating delivery can include spray, dipping, or applying through direct contact.

In one manner of practicing the method, after the liquid coating is applied to the air stream component in block 310, the liquid coating can be fully cured or dried in block 320 with a curing device. The curing step 320 can be performed through, for example, the application of heat energy. The heat energy can be delivered by the variety of device types, including combustible fuel powered devices, electric resistance devices, electric conductance devices, and electromagnetic wave devices. After the coated air stream component is allowed to cool in block 322, sufficient heat energy is applied to make the elastic coating tacky in block 324. When the surface achieves a desired level of adhesiveness such that it becomes adhesively receptive, solid particulate ozone-depleting catalysts are applied to the receptive surface in block 340 for adhesion to the air stream component. The resulting air stream component has a durable coating of ozone-depleting catalyst particles, wherein significant portions of the particle surface areas are exposed to the air stream for converting ozone.

Optionally, the liquid coating can be partially cured or dried in block 330. In this case, the surface of the air stream component maintains a desired level of adhesiveness such that it is adhesively receptive. Solid particulate ozone-depleting catalysts are then applied to the adhesively receptive surface in block 340 for adhesion to the air stream component. Practicing the method in a further optional manner, after the liquid coating is applied to the air stream component 310, solid particulate ozone-depleting catalysts can be directly applied to the uncured liquid coating the air stream component. Regardless of whether the coating is fully cured, cooled, and reheated, partially cured or uncured before applying the dry coating, after the dry coating is applied to the tacky surface in block 340 and any remaining uncured liquid coating can be cured or dried in block 350, if necessary.

Figure 4:
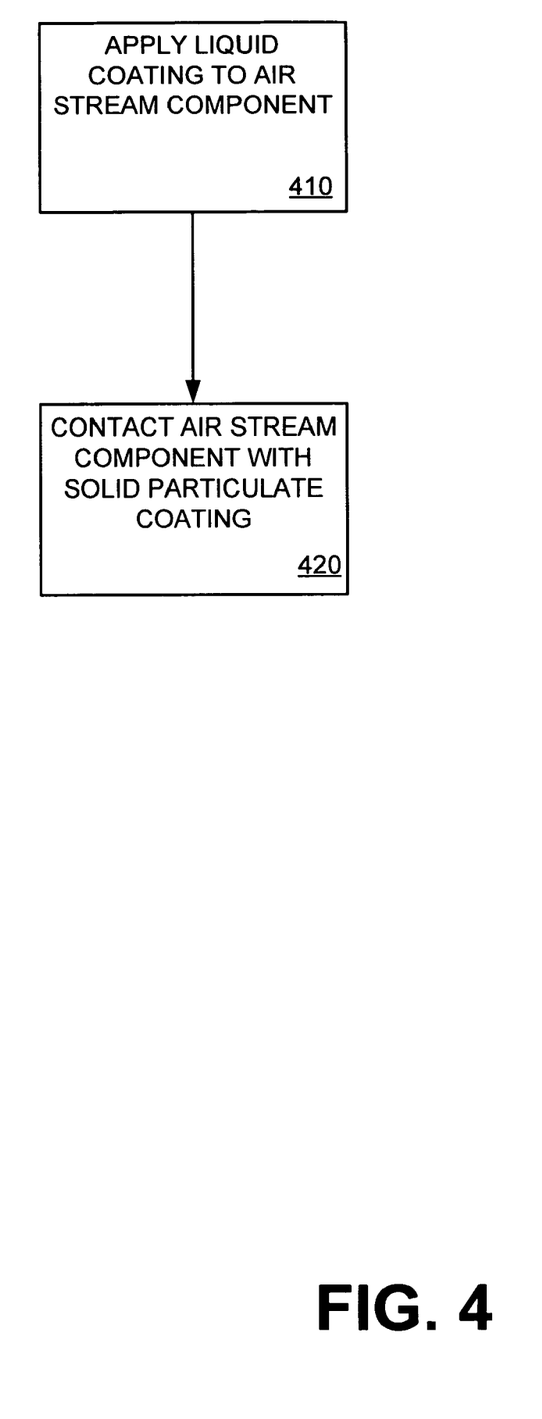

Brief reference is made to FIG. 4, which is a block diagram illustrating an exemplary embodiment of a method for applying an ozone-depleting coating to an air stream component. A liquid coating is applied to an air stream component in block 410. The liquid coating can be an adhesive that is cured heat, air, a chemical curing agent, infrared radiation, or ultra-violet light, among others. The liquid coated air stream component is contacted with a solid particulate coating in block 420. The solid particulate coating can be in a bath, can be directed to the air stream component or can be presented as an airborne concentration. The solid particulate coating adheres to the liquid coating to form a coating on the air stream component. The solid particulate coating is comprises of an ozone-depleting material such that when an air stream moves across the coated surface of the air stream component, an ozone to oxygen conversion occurs. This can provide environmentally beneficial results when coated air stream components are utilized in frequently used air handling systems. Examples of such systems include, heating, ventilation, air conditioning, vacuum cleaners, fans, blowers, and heat exchangers among others.

Figure 5A:
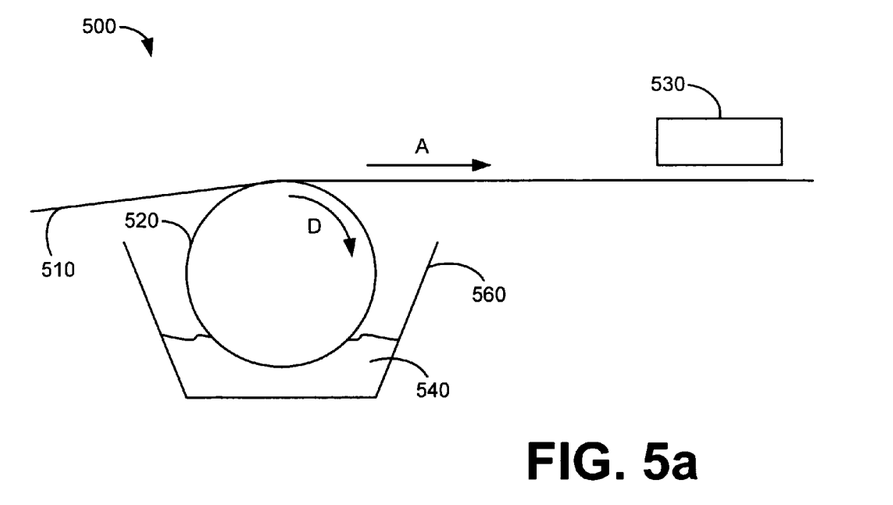
FIG. 5*a* illustrates a side view of an embodiment of a configuration for applying a liquid coating to a sheet material and curing the coating.

Reference is now made to FIG. 5a, which illustrates a side view of an embodiment of a configuration for applying a liquid coating to a sheet material and curing the coating. The sheet material 510 can be metallic or non-metallic, composite or monolithic, and woven or non-woven. The sheet material 510 can be utilized to produce any number of air stream components including, but not limited to heaters, air conditioning units, vacuum cleaners, fans, blowers, and heat exchangers. The sheet material 510 is driven in the direction A, generally across a coating roll 520. The coating roll, for example, rotates in a direction D and is partially immersed in a solution of liquid coating 540. The liquid coating 540 is maintained within a vat or trough 560. As the coating roll 520 rotates in conjunction with the linear travel of the sheet material 510, the liquid coating 540 is picked up by the coating roll 520 and deposited on the sheet material 510. The coated sheet material then passes in proximity to a curing device 530. The curing operation may be performed, as discussed above, through the application of heat. The curing device 530 can generate heat through combustion of fuel, electric resistance, electric inductance, and electromagnetic waves.

Figure 5B:
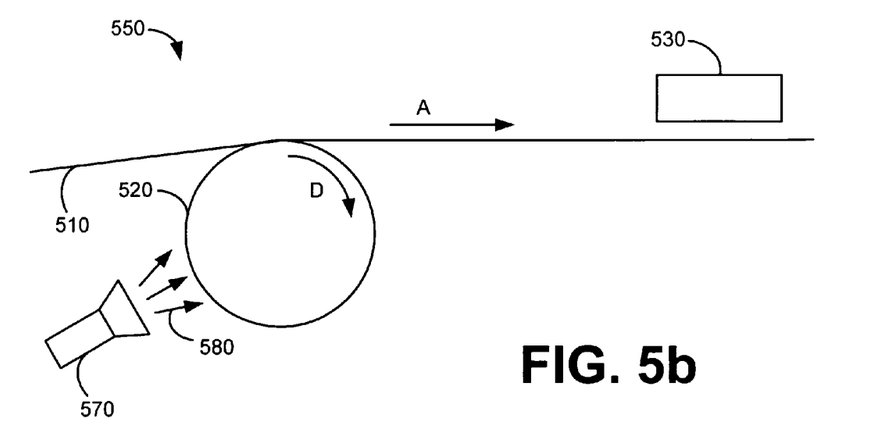
FIG. 5*b* illustrates a side view of an alternative embodiment of a configuration for applying a liquid coating to a sheet material using a roll and curing the coating.

Similarly, reference is now made to FIG. 5b, which illustrates a side view of an alternative embodiment of a system for applying a liquid coating to a sheet material and curing the coating. Under this method 550, the liquid coating 580 is applied to the coating roll 520 using a device for projecting the coating onto the roll. One such type of device might be, for example, one or more spray nozzles generating a pattern or stream of coating in the direction of the coating roll 520. The sheet material 510 can be metallic or non-metallic, monolithic or composite, and woven or non-woven.

Figure 6A:
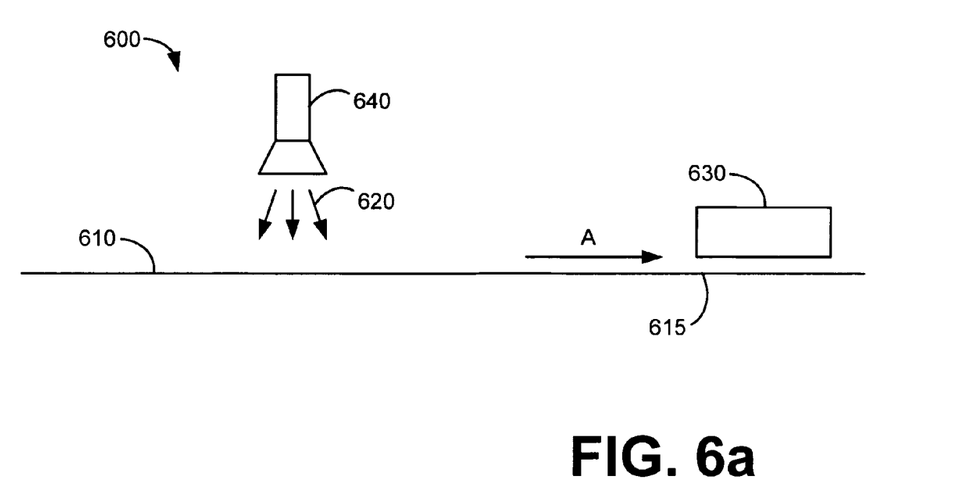
FIG. 6*a* illustrates a side view of an embodiment of a configuration for applying a liquid coating directly to a sheet material and curing the coating.

A side view of another alternative embodiment of a method of applying a liquid coating to a sheet material and curing the coating is shown in reference to FIG. 6a. A sheet material 610 moves in direction A through a stream or spray pattern of liquid coating 620. The stream or spray pattern of liquid coating 620 may be generated, for example, by one or more spray nozzles for directing the liquid coating toward the sheet material 610. The coated sheet material 615 is then subjected to a curing device 630.

Figure 6B:
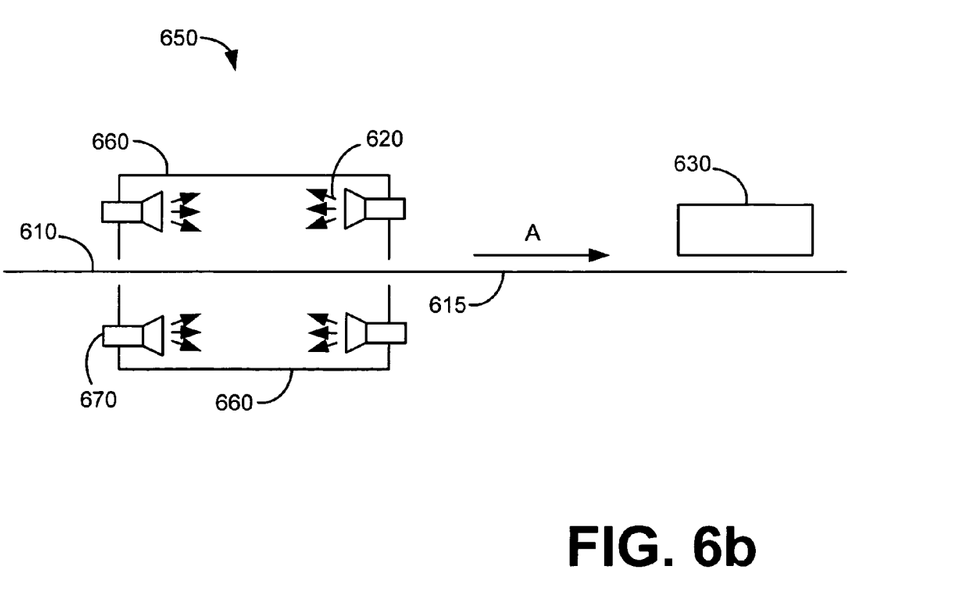
FIG. 6*b* illustrates a side view of an alternative embodiment of a configuration for applying a liquid coating directly to a sheet material and curing the coating.

Reference is now made to FIG. 6b, which illustrates a side view of an alternative embodiment for applying a liquid coating to a sheet material and then curing the coating 650. The sheet material 610 travels in direction A through a chamber or enclosure 660. Within the chamber or enclosure, at least one device 670 is configured to disperse the liquid coating 620 in a mist or atomized form. Additionally, the delivery devices 670 may apply an electrical charge to the atomized coating which is opposite the static electrical charge of the sheet material 610. As the sheet material 610 passes through the enclosure 660, the charged coating droplets 620 are electrostatically drawn to the sheet material 610. The coated sheet material 615 is then subjected to a curing device 630. In accordance with the discussion above, curing may be accomplished by applying heat through combustion, electric resistance, electric inductance, or electromagnetic waves.

Figure 7A:
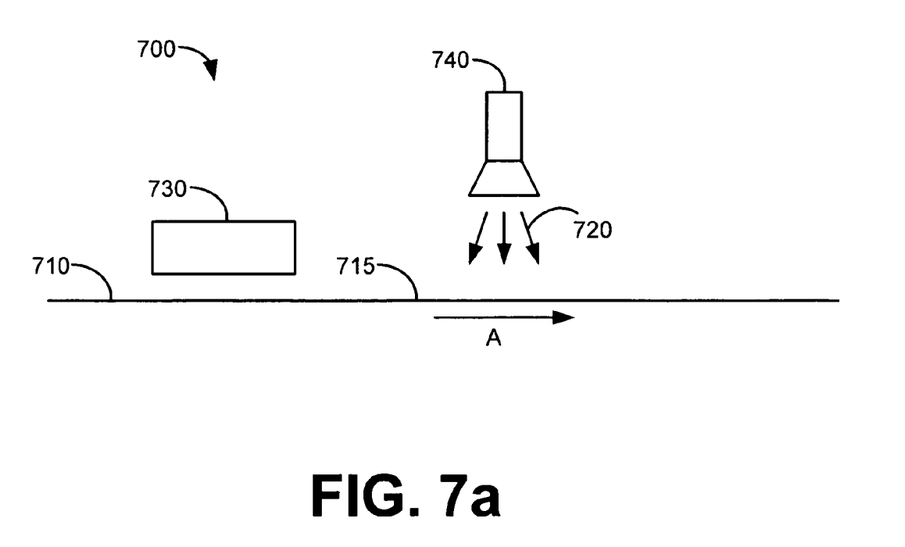
FIG. 7*a* illustrates a side view of an embodiment of a method of applying a solid particulate coating to a sheet material.

Reference is now made to FIG. 7a, which illustrates a side view of an embodiment of performing the solid particulate coating step 700. A previously coated sheet material 710 moving in direction A, is subjected to a heating device 730. As discussed above, the heating device can utilize numerous techniques for transmitting heat energy to the coated sheet material 710. The heated, coated sheet material 715 is adhesively receptive and passes in proximity to a concentration of solid particulate coating 720. Particles in the concentration of solid particulate coating 720 adhere to the heated, coated sheet material 715 because of the tacky or adhesive nature of the previously applied liquid coating (FIGS. 5a, 5b, 6a and 6b). The coating methods of this and other embodiments may be used to apply coating on one or both sides of a sheet material 715.

Figure 7B:
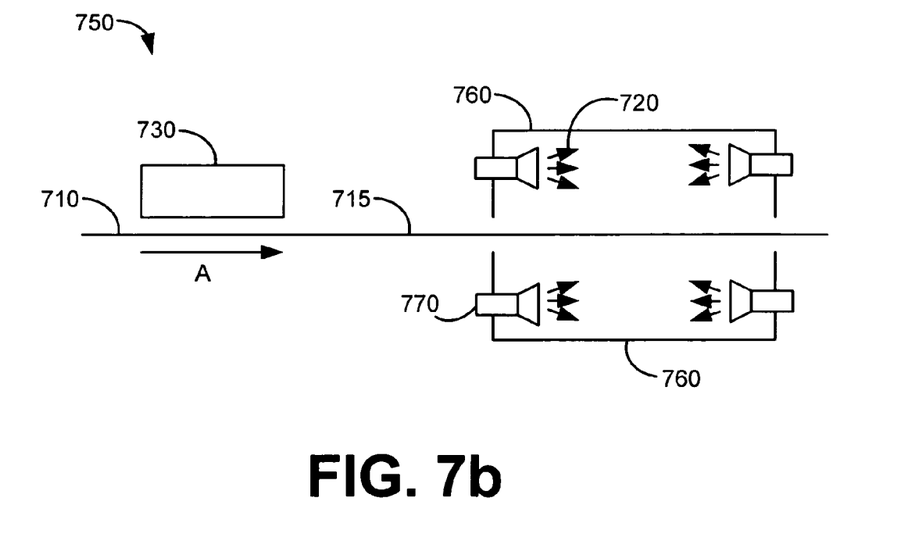
FIG. 7*b* illustrates a side view of an alternative embodiment for applying a solid particulate coating to a sheet material.

Referring now to FIG. 7b, which illustrates a side view of an embodiment for applying a solid particulate coating 750, the previously coated sheet material 710 travels in direction A. Consistent with the embodiment discussed in FIG. 7a, the coated sheet material 710 is heated by a heating device 730. The heated, coated sheet material 715 enters a coating chamber or enclosure 760 for exposure to a concentration of solid particulate coating 720. Solid particulate coating 720 is delivered by, for example, sprays or blowers 770. The tacky or adhesive characteristic of the heated, coated sheet material 715 provides a receptive surface for the individual particles of the concentration of solid particulate coating 720 to adhere.

Figure 8A:
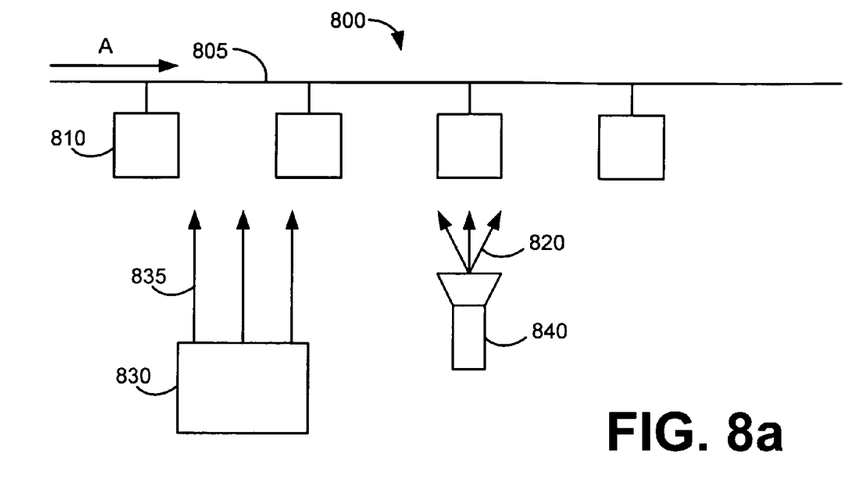
FIG. 8*a* illustrates an embodiment of a method of applying a solid particulate coating to an air stream component.

Reference is now made to FIG. 8a, which illustrates a side view of an embodiment of a system for applying a solid particulate coating to an air stream component. An air stream component 810 is moved, for example, along a conveying type device 805 in direction A. The air stream component 810 can be fabricated, in part, using components previously coated with a liquid adhesive coating as discussed above. Alternatively, the air stream component 810 can be fabricated and then coated with a liquid adhesive. The air stream component 810 receives heat energy 835 from a heating device 830 for the purpose of increasing the adhesive characteristic of the previously coated surfaces of the air stream component 810. The adhesive characteristic of the air stream component 810 can also be the result of the composition of the air stream component 810 and require no previously applied liquid coating in some embodiments. Alternatively, the adhesive characteristic of the air stream component 810 can be caused by a previously applied and uncured coating on the surface of the air stream component 810. After the air stream component 810 is heated such that the surface is tacky, a concentration of solid particulate coating 820 is directed to the air stream component 810. The solid particulate coating 820 is directed using a solid coating delivery device 840 such as, for example, a dry sprayer or blower. The solid coating delivery device 840 may comprise a device having a plurality of solid particulate coating delivery points positioned to direct the solid particulate coating 820 toward the air stream component 810 from multiple directions.

The solid particulate coating 820 has a substantially higher hardness characteristic than the materials used in the fabrication of the air stream component. By applying the solid particulate coating 820 to the air stream component 810 after the air stream component is formed, the wear on the tooling used to form the air stream component is significantly reduced.

Figure 8B:
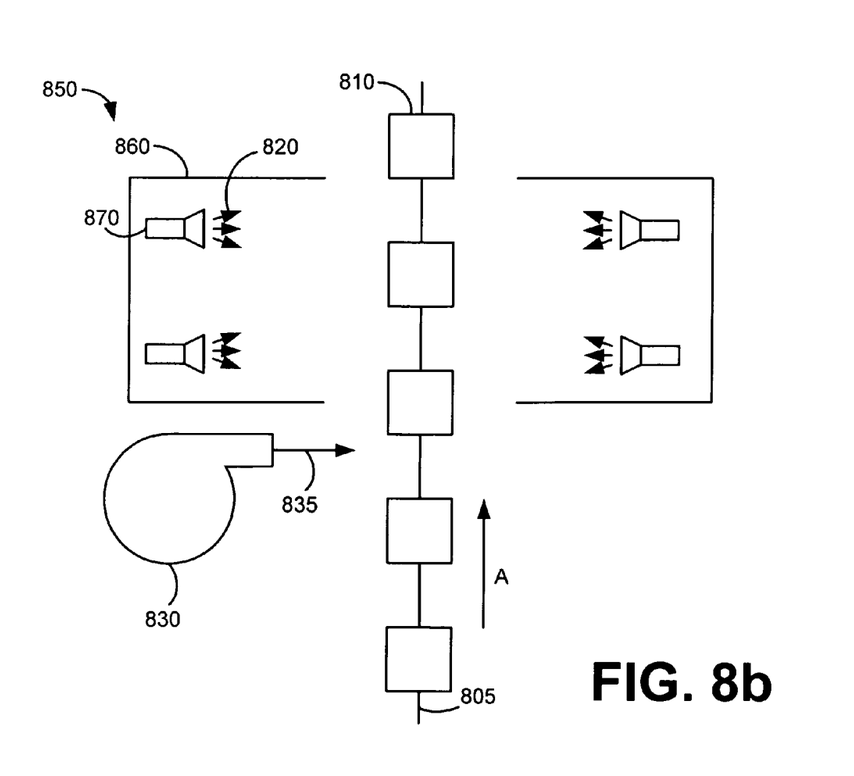
FIG. 8*b* is a side view of an alternative embodiment of a method of applying a solid particulate coating to surfaces of an air stream component.

Reference is now made to FIG. 8b, which illustrates a side view of an alternative embodiment of applying a solid particulate coating to an air stream component. An air stream component 810 moves in direction A via a conveying device 805. The air stream component 810 receives heat energy 835 from a heating device 830. The heat energy 835 initiates the adhesive characteristic of the previously coated surfaces of the air stream component wherein the surfaces become receptive to particles of a solid particulate coating 820. After receiving the heat energy 835, the air stream component 810 is conveyed into a coating chamber or enclosure 860. Within the coating chamber 860, at least one solid coating delivery device 870 creates a suspended concentration of solid particulate coating 820. The particles of the solid particulate coating 820 which come in contact with the adhesively receptive surfaces of the heated air stream component 810 adhere to produce a durable coating of ozone-depleting catalysts.

Figure 9:
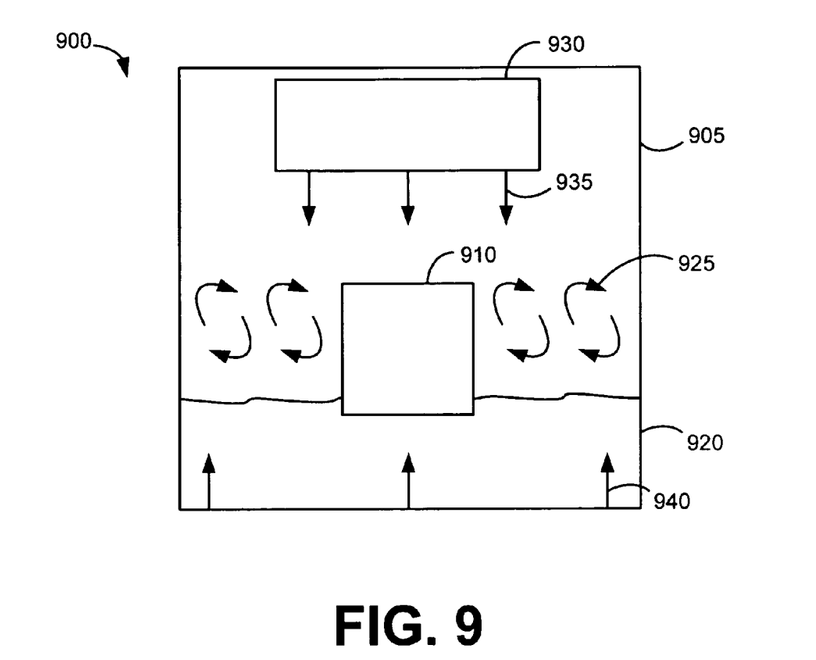
FIG. 9 illustrates a side view of an alternative embodiment of a method of applying a solid particulate coating to previously coated surfaces an air stream component.

Reference is now made to FIG. 9, which illustrates a side view of an alternative embodiment of a method of applying a solid particulate coating. An air stream component 910 is placed inside a coating chamber or enclosure 905. The air stream component 910 is supported, for example, in a suspended manner (not shown) or on a rack or grate (not shown). Heat energy 935 is applied using a heating device 930, such that the previously coated surfaces of the air stream component 910 initiate an adhesive characteristic coincident with the increase in temperature. In alternative embodiments, the air stream component 910 can be constructed of a material or composition that includes a heat-activated adhesive characteristic in other embodiments, the air stream component 910 is coated with an adhesive that remains uncured before being placed into the enclosure 905. An accumulation of solid particulate coating 920 is stirred using a fluidizing input 940. The fluidizing input 940 may be, for example, one or more blowers or sources of compressed air or other gas (not shown). Application of the fluidizing input 940 to the accumulation of solid particulate coating 920 creates a fluidized bed 925 of solid particulate coating 920. This fluidized bed 925 of solid particulate coating 920 presents a highly concentrated and dynamic cloud of solid particulate coating 920 particles to the receptive surfaces of the air stream component 910. One of ordinary skill in the art will appreciate that the concentration of solid particulate coating 920 deposited on the air stream component 910 is, in part, a function of the configuration of the fluidized bed, the duration of exposure and the amount and adhesive quality of the previously applied coating or air stream component material.

Figure 10:
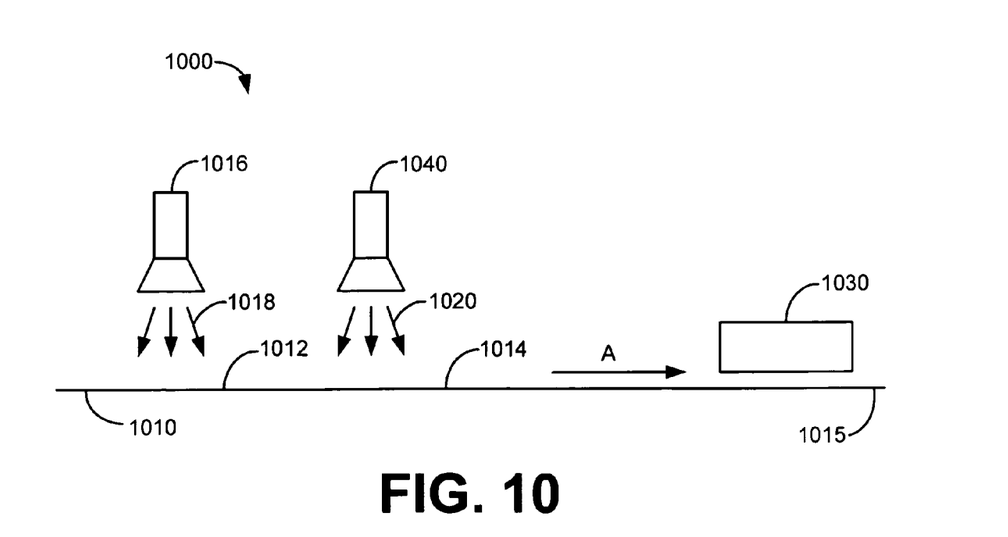
FIG. 10 illustrates a side view of an alternative embodiment of a method of applying ozone-depleting catalysts to a sheet material.

Reference is now made to FIG. 10, which illustrates a side view of an alternative embodiment of a method of applying ozone-depleting catalysts to a sheet material, wherein the sheet material is formed as a component of an air stream component. The sheet material 1010 can be metallic or non-metallic, monolithic or composite, and woven or non-woven. A sheet material 1010 moves in direction A and receives an adhesive coating 1018 from an adhesive coating device 1016. As discussed above, the adhesive coating 1018 may be applied to the sheet material 1010 using any number of methods. The adhesively coated sheet material 1012 is exposed to a concentration of solid particulate coating 1020 via a solid particulate coating delivery device 1040. As discussed above, the solid particulate coating delivery device 1040 may comprise, for example, a variety of devices and combinations of devices. The solid coated sheet material 1014 is then subjected to a curing device 1030 for curing the adhesive coating 1018 using methods discussed above. When the solid coated sheet material 1014 cools after curing, the solid particulate coating 1020 is adhesively retained by the adhesive coating 1018. The cured and coated sheet material 1015 can then be utilized to produce a variety of air stream components.

Figure 11:
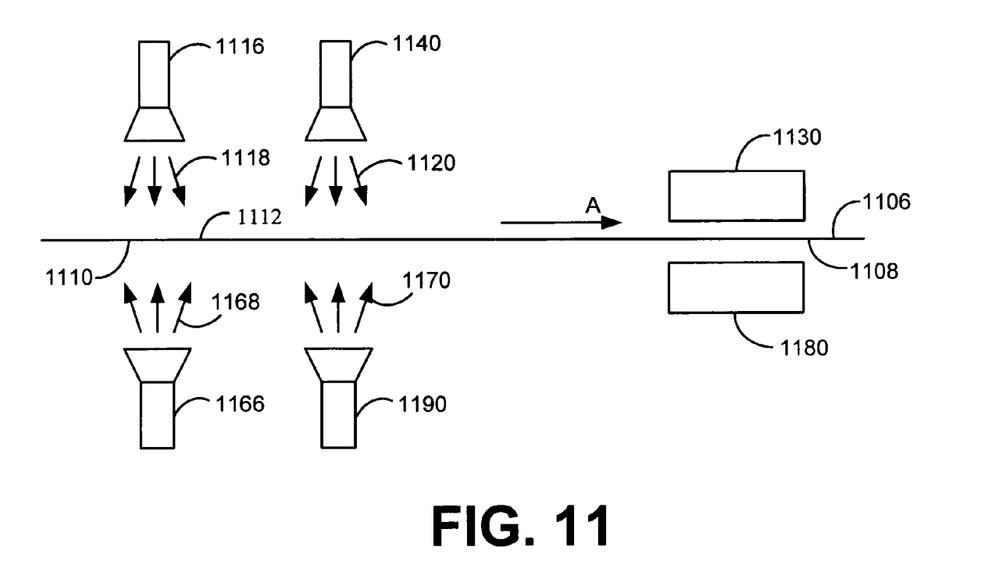
FIG. 11 illustrates a side view of an embodiment of a system of applying ozone-depleting catalysts to multiple surfaces of a sheet material.

Reference is now made to FIG. 11, which illustrates a side view of an embodiment of a system of applying ozone-depleting catalysts to multiple surfaces of a sheet material. The sheet material 1110 moves in direction A and receives liquid coating 1118, 1168 on the first and second surfaces, 1106, 1108, respectively. The liquid coatings 1118 and 1168 are delivered via first and second liquid coating delivery devices 1116 and 1166, respectively. The liquid coated sheet material 1112 is then exposed to concentrations of solid particulate coating particles 1120, 1170 on the first and second surfaces 1106, 1108, respectively. The solid particulate coating concentrations 1120, 1170 are delivered using solid particulate coating delivery devices 1140, 1190, respectively. The solid coated sheet material 1112 is then cured using curing devices 1130, 1180. One of ordinary skill in the art will appreciate that the liquid coating delivery devices 1116, 1166, the solid particulate coating delivery devices 1140, 1190, and the curing devices 1130, 1180 may be any number of combinations of the devices discussed above. Further, any of the methods or systems as disclosed above are applicable for coating multiple surfaces of a substrate.

Figure 12:
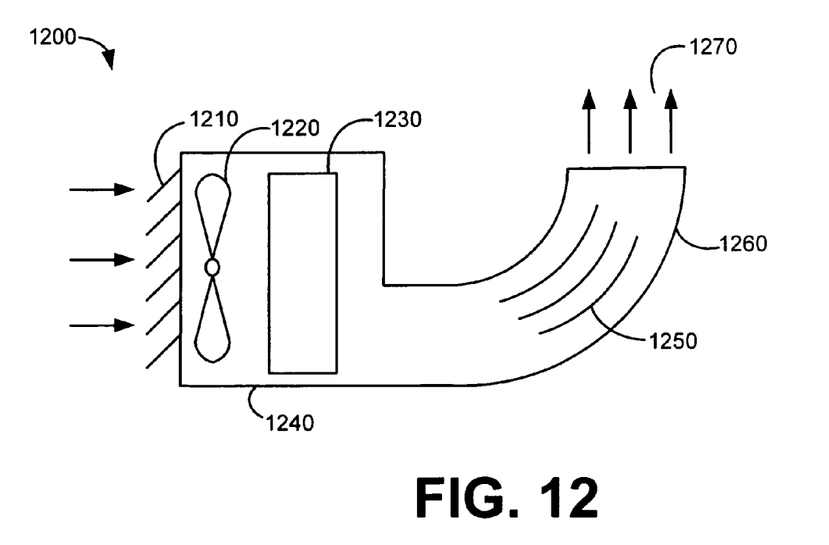
FIG. 12 illustrates an embodiment of an apparatus for using one or more air stream components having an ozone-depleting catalytic coating.

Reference is now made to FIG. 12, which illustrates an embodiment of an apparatus for using one or more air stream components having an ozone-depleting catalytic coating. The apparatus 1200 generally includes one or more air deflection components 1210 and one or more air movement components 1220. The apparatus 1200 can also include a heat-exchanging component 1230 and one or more air stream plenum walls 1240 for containing, isolating, or directing the air stream. Additionally, the apparatus 1200 can include airflow straighteners 1250 and one or more air stream directing components 1260 among others. Any or all of the surfaces in the air stream can be configured to include the ozone-depleting catalytic coating using the techniques disclosed herein. In this manner, as each of the components of the apparatus 1200 come into contact with the air moving across the surfaces, the ozone is reduced to oxygen by the catalytic particles and treated air 1270 exists the apparatus 1200. In some embodiments, the apparatus can be fully or partially assembled before the application of the adhesive and ozone-depleting coating. For example, the adhesive coating can be applied to the individual air stream components before assembly and the solid particulate coating can be applied to the assembly using, for example, a directed stream of solid particulate coating. Similarly, the adhesive coating can also be applied to the air stream components after they are assembled as an air handling apparatus. In this manner, the surfaces that experience the greatest contact with the air stream will retain the highest concentration of the ozone-depleting catalyst. Likewise, areas not subjected to significant air stream contact will not be coated as heavily, if at all.

Figure 13:
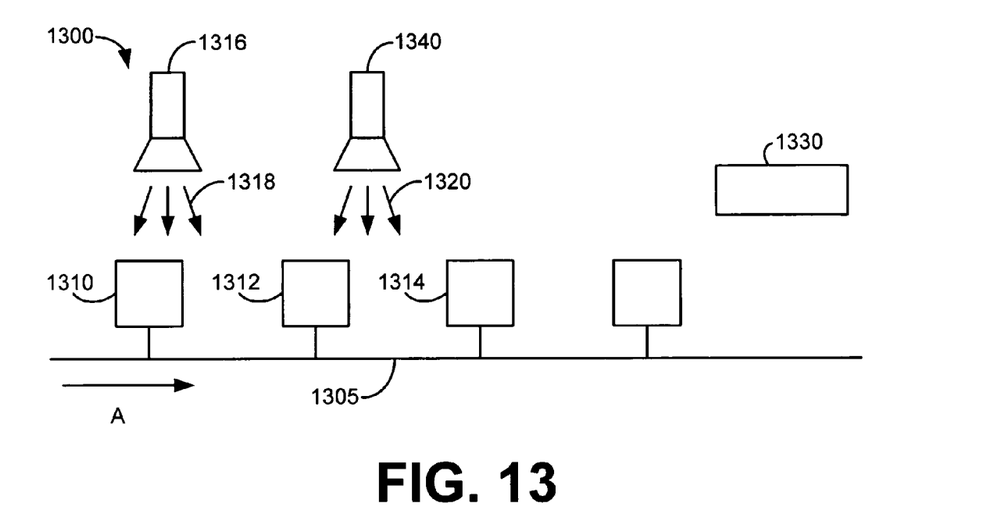
FIG. 13 illustrates a side view of an embodiment for applying a solid particulate coating to an air stream component.

Reference is now made to FIG. 13, which illustrates a side view of an embodiment for applying a solid particulate coating to an air stream component. An air stream component 1310 is moved, for example, along a conveying type device 1305 in direction A and receives an adhesive coating 1318 from an adhesive coating device 1316. As discussed above, the adhesive coating 1318 may be applied to the air stream component 1310 using any number of methods. The adhesively coated air stream component 1312 is exposed to a concentration of solid particulate coating 1320 via a solid particulate coating device 1340. As discussed above, the solid particulate coating delivery device 1340 may comprise, for example, a variety of devices and combinations of devices. The solid coated air stream component 1314 is then subjected to a curing device 1330 for curing the adhesive coating 1318 using methods discussed above. In some embodiments, the curing can be performed using heat. Similarly, in other embodiments, curing can be performed utilizing fans, blowers, chemical curing agents, and ultraviolet light, among others. When the solid coated air stream component 1314 cools after curing, the solid particulate coating 1320 is adhesively retained by the adhesive coating 1318.

Figure 14:
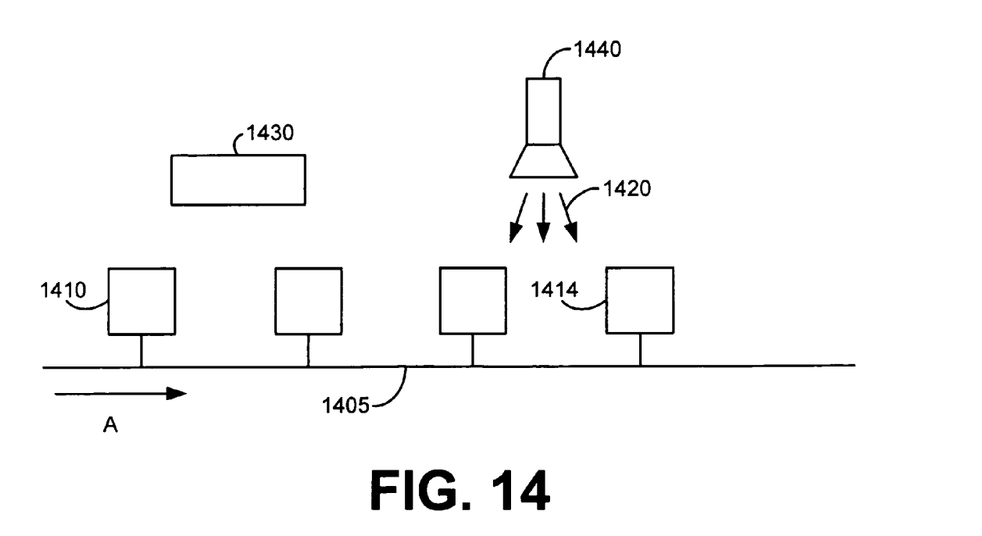
FIG. 14 illustrates a side view of an alternative embodiment for applying a solid particulate coating to an air stream component.

Reference is now made to FIG. 14, which illustrates a side view of an alternative embodiment for applying a solid particulate coating to an air stream component. An air stream component 1410 is moved, for example, along a conveying type device 1405 in direction A. The air stream component 1410 is composed, in part, of an exterior surface that exhibits an increased adhesive characteristic when the air stream component 1410 receives heat from a heating device 1430. The heat initiates the adhesive characteristic of the exterior surfaces of the air stream component wherein the surfaces become receptive to particles of a solid particulate coating 1420 via a solid particulate coating delivery device 1440. When the solid coated air stream component 1414 cools, the solid particulate coating 1420 is adhesively retained by the surfaces of the air stream component 1414.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, at least the following is claimed:

1. A method for applying an ozone-depleting coating to an air stream component, comprising: applying a liquid coating to the air stream component; and contacting the air stream component with a solid particulate coating, wherein the solid particulate coating adheres to the air stream component,
    wherein the liquid coating is a heat-activated polymer which includes a heat-activated adhesive characteristic,
    wherein the heat-activated polymer is operable to increase the adhesive characteristic of the heat-activated polymer when heat is applied to the heat-activated polymer.

2. The method of claim 1, further comprising partially curing the liquid coating before the contacting the air stream with the solid particulate coating.

3. The method of claim 1, further comprising curing the liquid coating after the contacting the air stream with the solid particulate coating.

4. The method of claim 3, wherein the curing step comprises applying heat to the coated air stream component, wherein the heat is generated by a first heat generating apparatus.

5. The method of claim 1, the applying step further comprising spraying the liquid coating onto the air stream component.

6. The method of claim 1, the applying step further comprising immersing the air stream component in a liquid coating bath.

7. The method of claim 1, further comprising: curing the liquid coating before the contacting the air stream component with the solid particulate coating; cooling the cured liquid coating; and heating the air stream component to increase an adhesive property.

8. The method of claim 7, wherein the air stream component is heated to a temperature in a range between 80 and 400 degrees Fahrenheit.

9. The method of claim 8, wherein, the range is preferably between 110 and 165 degrees Fahrenheit.

10. The method of claim 8, wherein the range is preferably between 120 and 130 degrees Fahrenheit.

11. The method of claim 7, the curing step, wherein the air stream component is heated to a temperature in the range between 250 and 550 degrees Fahrenheit.

12. The method of claim 11, wherein the temperature range is preferably between 300 and 500 degrees Fahrenheit.

13. The method of claim 11, wherein the temperature range is preferably between 400 and 450 degrees Fahrenheit.

14. The method of claim 1, wherein the contacting further comprises directing the solid particulate coating to the air stream component.

15. The method of claim 1, wherein the solid particulate coating is a chemically reducing component.

16. The method of claim 15, wherein the chemically reducing component is selected from a group comprising: Manganese, Palladium Dioxide and Titanium Dioxide.

17. The method of claim 1, wherein the solid particulate coating comprises Manganese Dioxide.

18. The method of claim 1, wherein the air stream component comprises a non-planar structure.

19. The method of claim 1, wherein the heat-activated polymer is operable to increase the adhesive characteristic of the heat-activated polymer when heat is applied to the heat-activated polymer after a first curing of the heat-activated polymer.

20. A method, comprising:
    applying a liquid coating to a surface of an air stream component;
    contacting the liquid coating on the surface of the air stream component with a plurality of solid particulate coating particles;
    curing the liquid coating before contacting the liquid coating with the plurality of solid particulate coating particles;
    cooling the cured liquid coating after curing the liquid coating; and
    heating the air stream component to increase an adhesive property before contacting the liquid coating with the plurality of solid particulate coating particles.

21. The method of claim 20, wherein contacting the liquid coating comprises positioning the surface of the air stream component in a suspension having a concentration of the plurality of solid particulate coating particles.

22. A method for applying an ozone-depleting coaling to an air stream component, comprising:
    applying a liquid coating to the air stream component;
    curing the liquid coating in preparation for at least one subsequent forming operation;
    heating the subsequently formed air stream component to increase an adhesive property; and
    contacting the air stream component with a solid particulate coating, wherein the solid particulate coating adheres to the air stream component responsive to the adhesive property,
    wherein the liquid coating is a heat-activated polymer which includes a heat-activated adhesive characteristic,
    wherein the heat-activated polymer is operable to increase the adhesive characteristic of the heat-activated polymer when heat is applied to the heat-activated polymer.

23. A method, comprising:
    applying a liquid coating to a surface of an air stream component;

contacting the liquid coating on the surface of the air stream component with a plurality of solid particulate coating particles;

curing the liquid coating in preparation for at least one subsequent forming operation before contacting the liquid coating with the plurality of solid particulate coating particles; and heating the subsequently formed air stream component to increase an adhesive property before contacting the liquid coating with the plurality of solid particulate coating particles.

* * * * *